United States Patent [19]

Sugiura et al.

[11] 4,285,207

[45] Aug. 25, 1981

[54] AIR CONDITIONING APPARATUS COMPRISING REFRIGERANT SHORTAGE SENSOR

[75] Inventors: Hiroyuki Sugiura; Ryota Hasegawa; Teruo Nakamura, all of Konan, Japan

[73] Assignee: Diesel Kiki Company, Ltd., Tokyo, Japan

[21] Appl. No.: 59,723

[22] Filed: Jul. 23, 1979

[30] Foreign Application Priority Data

Jul. 31, 1978 [JP] Japan ........................ 53/105097[U]
Aug. 4, 1978 [JP] Japan ........................ 53/107649[U]
Sep. 9, 1978 [JP] Japan ........................ 53/124175[U]

[51] Int. Cl.³ ........................ B60H 3/04; G05D 23/32
[52] U.S. Cl. ........................ 62/133; 62/158; 62/228; 62/323.4; 62/228 R
[58] Field of Search ........................ 62/188, 133, 228 R, 62/228 B, 158, 323 C; 137/412

[56] References Cited

U.S. PATENT DOCUMENTS

| | | | |
|---|---|---|---|
| 3,107,818 | 10/1963 | Carmellini et al. | 137/412 X |
| 3,702,064 | 11/1972 | Ciolli | 62/228 R |
| 3,744,267 | 7/1973 | Norbeck | 62/228 R |
| 4,167,858 | 9/1979 | Kojima et al. | 62/228 R |

*Primary Examiner*—William E. Wayner
*Attorney, Agent, or Firm*—David G. Alexander

[57] ABSTRACT

A float operated switch (21) is actuated when the level of refrigerant fluid in a reservoir (11) is below a predetermined value to produce an electrical signal. The signal is delayed by 10 to 30 seconds and applied to a switch circuit (54) to disengage an electromagnetic clutch (63) and thereby de-energize a compressor (64). The clutch (63) is also disengaged by the action of a thermal switch (61) when the temperature in a space which is being air conditioned drops below a predetermined value. The operation of the float operated switch (21) is inhibited when the sensed temperature is below the predetermined value and also when a motor which drives the compressor (64) is not operating to prevent erroneous de-energization of the compressor (64).

14 Claims, 5 Drawing Figures

AIR CONDITIONING APPARATUS COMPRISING REFRIGERANT SHORTAGE SENSOR

BACKGROUND OF THE INVENTION

The present invention relates to an air conditioning apparatus for an automotive vehicle or the like comprising means for automatically sensing when the level of refrigerant fluid is low and de-energizing the apparatus in response thereto.

An air conditioning system for a motor vehicle or the like generally comprises a reservoir for refrigerant fluid. A compressor compressively liquifies the fluid from the reservoir and feeds it through a refrigerant circuit for cooling a cabin of the vehicle.

The operation of the system is controlled by a thermal switch which senses the temperature in the cabin or at the outlet of an evaporator and de-energizes the compressor when the temperature drops below a predetermined value. When the temperature again rises above the predetermined value, the compressor is again energized.

It is also known to sense the level of fluid in the reservoir and de-energize the air conditioning system when the level drops below a predetermined level due to leakage of fluid from the system. However, the prior art system suffers from the drawback in that the level of refrigerant in the reservoir tends to drop below the predetermined level when the compressor is stopped even though the amount of refrigerant in the system is sufficient. This makes it impossible to start the compressor and thereby operate the air conditioning system.

SUMMARY OF THE INVENTION

An air conditioning apparatus embodying the present invention includes a motor driven compressor and a refrigerant reservoir connected to the compressor, and is characterized by comprising level sensor means for producing an electrical signal when a refrigerant level in the reservoir is below a predetermined value, level switch means for normally controlling the compressor to be motor driven and for controlling the compressor to be not motor driven in response to the electrical signal, and delay means connected between the level sensor means and the level switch means for delaying the electrical signal for a predetermined length of time.

In accordance with the present invention, a float operated switch is actuated when the level of refrigerant fluid in a reservoir is below a predetermined value to produce an electrical signal. The signal is delayed by 10 to 30 seconds and applied to a switch circuit to disengage an electromagnetic clutch and thereby de-energize a compressor. The clutch is also disengaged by the action of thermal switch when the temperature in a space which is being air conditioned drops below a predetermined value. The operation of the float operated switch is inhibited when the sensed temperature is below the predetermined value and also when a motor which drives the compressor is not operating to prevent erroneous de-energization of the compressor.

It is an object of the present invention to provide an air conditioning apparatus for a motor vehicle or the like comprising means for accurately detecting when an amount of refrigerant in the system becomes insufficient and automatically de-energizing the apparatus in response thereto.

It is another object of the present invention to provide an air conditioning apparatus comprising sensor means for sensing a shortage of refrigerant fluid which is not erroneously influenced by a low liquid refrigerant level which occurs when a compressor of the system is de-energized.

It is another object of the present invention to provide a generally improved air conditioning apparatus for a motor vehicle or the like.

Other objects, together with the foregoing, are attained in the embodiments described in the following description and illustrated in the accompanying drawing.

DESCRIPTION OF THE PREFERRED EMBODIMENTS

While the air conditioning apparatus of the present invention is susceptible of numerous physical embodiments, depending upon the environment and requirements of use, substantial numbers of the herein shown and described embodiments have been made, tested and used, and all have performed in an eminently satisfactory manner.

Figure 1:
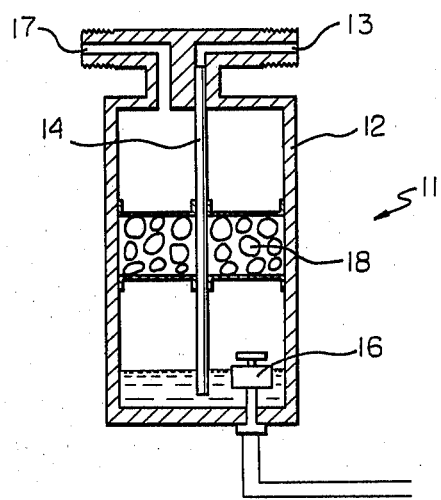
FIG. 1 is a side elevation of a refrigerant reservoir and level sensor of the present invention.

Referring now to FIG. 1 of the drawing, a refrigerant reservoir of an air conditioning apparatus for an automotive vehicle or the like is generally designated as 11 and comprises a body 12. Refrigerant fluid is fed into the body 12 from an evaporator (not shown) through an inlet 13. A pipe 14 extends from the inlet 13 downwardly to close proximity with the bottom of the body 12. A level sensor 16 which is shown in greater detail in FIG. 2 is provided at the bottom of the body 12.

The body 12 is also formed with an outlet 17 leading to a compressor (not shown) of the air conditioning system. A mass of dessicant 18 is disposed in the body 12 so that the refrigerant fluid in gaseous form passes therethrough from the inlet 13 to the outlet 17 and moisture is absorbed from the fluid by the dessicant 18.

Figure 2:
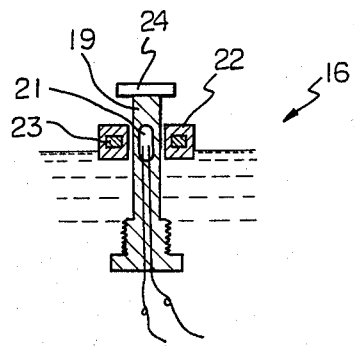
FIG. 2 is an enlarged side elevation of the level sensor.

The sensor 16 is illustrated in FIG. 2 as comprising a tubular body 19. A reed switch 21 is disposed in the body 19. An annular float 22 embraces the body 19 and is vertically slidable thereon. A magnet 23 is embedded in the float 22. A stop 24 is formed at the upper end of the body 19 to prevent the float 22 from detaching therefrom. The lower end of the body 19 is fixed to the bottom of the body 12.

During operation of the air conditioning apparatus a certain amount of refrigerant fluid in liquid form accumulates in the bottom of the body 12. The float 22 floats on the liquid refrigerant. When the level of the liquid refrigerant is above a predetermined safe level, the float 22 abuts against the stop 24 and the magnet 23 causes the reed switch 21 to close. When, however, due to leakage of refrigerant from the apparatus the level of liquid refrigerant drops below the predetermined value (there is a shortage of refrigerant in the system), the float 22 drops below the reed switch 21 and the reed switch 21 opens.

Figure 3:
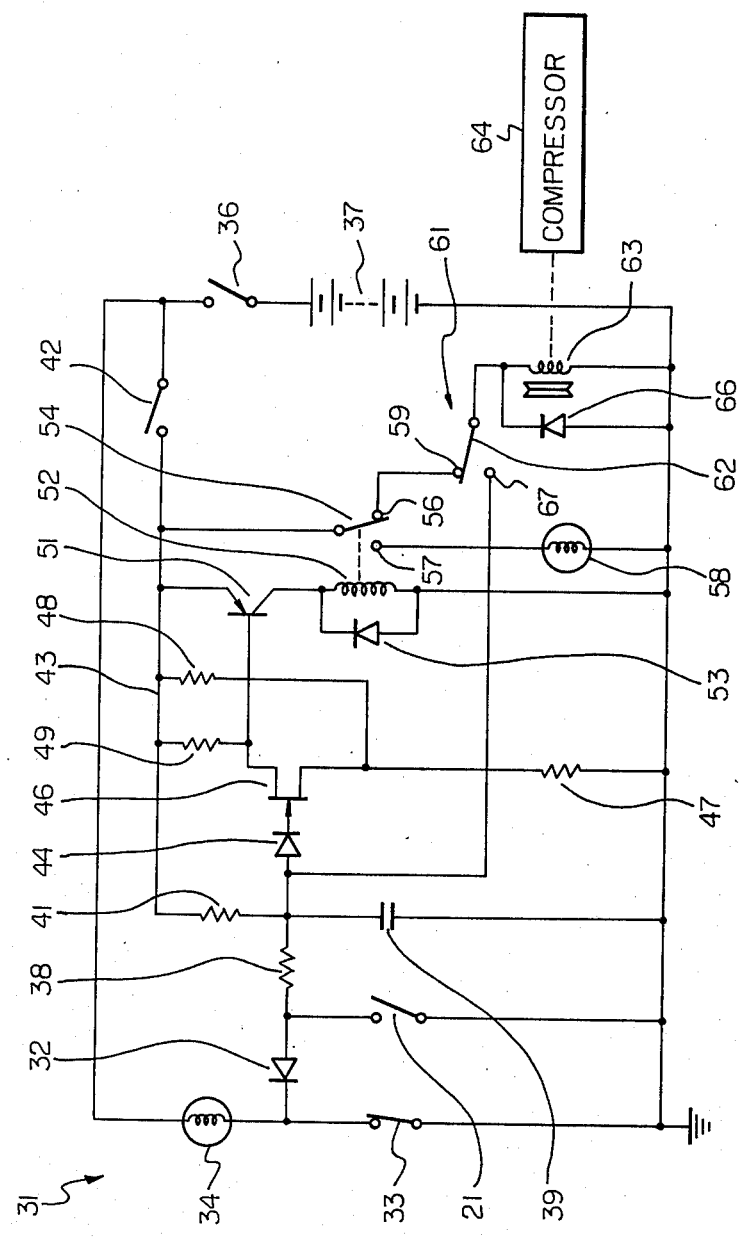
FIG. 3 is an electrical schematic diagram of a first embodiment of the present invention.

A first air conditioning apparatus embodying the present invention is illustrated in FIG. 3 and generally designated as 31. The reed switch 21 of the sensor 16 is connected between the anode of a diode 32 and ground. The cathode of the diode 32 is connected through an operation sensor switch 33 to ground and also through an operation indicator lamp 34 and key switch 36 to the positive terminal of a power source such as a battery 37. The negative terminal of the battery 37 is grounded, although the ground connection is arbitrary.

The anode of the diode 32 is also connected through a resistor 38 and a capacitor 39 to ground. The junction of the resistor 38 and capacitor 39 is connected through a resistor 41 and air conditioning switch 42 to the junction of the switch 36 and lamp 34. The resistor 41 is connected to the switch 42 through a bus line 43.

The junction of the resistor 38 and capacitor 39 is also connected to the anode of a diode 44, the cathode of which is connected to the gate of a field effect transistor (FET) 46. The drain of the transistor 46 is connected to ground through a resistor 47 and also to the bus line 43 through a resistor 48. The resistors 47 and 48 constituted a voltage divider for biasing the drain of the transistor 46.

The source of the transistor 46 is connected to the bus line 43 through a resistor 49 and also to the base of a PNP drive transistor 51. The emitter of the transistor 51 is connected to the bus line 43. The collector of the transistor 51 is connected through a relay coil 52 to ground. A diode 53 is connected across the relay coil 52 to prevent a buildup of counterelectromotive force.

A movable contact 54 controlled by the coil 52 is connected to the bus line 43 and engages with a fixed contact 56 when the coil 52 is not energized. When the coil 52 is energized, the movable contact 54 engages with a fixed contact 57. The contact 57 is connected to ground through a refrigerant shortage indicator lamp 58. The contact 56 is connected to a fixed contact 59 of a temperature switch 61.

A movable contact 62 of the switch 61 is connected to ground through an electromagnetic clutch 63. The clutch 63, when engaged, connects a compressor 64 of the air conditioning apparatus 31 to an engine or motor (not shown). A counterelectromotive force blocking diode 66 is connected across the clutch 63. A fixed contact 67 of the switch 61 is connected to the anode of the diode 44.

The present invention is applicable to an air conditioning system in which the compressor 64 is driven from an engine of a motor vehicle through the clutch 63. However, although such an embodiment is not illustrated, the present invention is also applicable to a refrigeration system in which the compressor 64 is driven directly by an electric motor.

The key switch 36 is closed by the operator to start the motor vehicle and may be constituted by an ignition switch. The switch 42 is closed to operate the air conditioning apparatus 31. Normally, the coil 52 is de-energized and the contact 54 engages with the contact 56 to connect the clutch 63 to the battery 37 through the switch 61.

The switch 61 is a thermal switch and may be embodied by a bimetalic strip or coil (not shown) with the switch contact 62 attached thereto. When the ambient temperature is above a predetermined value, the contact 62 engages with the contact 59. However, when the ambient temperature drops below the predetermined value, the strip flexes and causes the contact 62 to engage with the contact 67. Such thermal switches are well known in the art and commercially available as off the shelf items. The switch 61 may be disposed in the vehicle cabin or at the outlet of an evaporator (not shown) of the air conditioning apparatus 31.

When the temperature is above the predetermined value, the switch 61 connects the clutch 63 across the battery 37. The clutch 63 thus energized engages and connects the compressor 64 to the engine to be driven therefrom. This causes the air conditioning apparatus 31 to operate. When the air has been sufficiently cooled that the temperature drops below the predetermined value, the switch 61 disconnects the clutch 63 from the battery 37 to disconnect the compressor 64 from the engine and shut off the air conditioning apparatus 31.

The switch 21 operates as described above to sense the level of refrigerant in the reservoir 11. When the level drops below a predetermined value indicating a shortage of refrigerant, the switch 21 opens.

The resistor 31 is selected to have a relatively low value. Thus, when there is sufficient refrigerant in the reservoir 11 and the switch 21 is closed, the junction of the resistor 41 and capacitor 39 is connected to ground through the low resistance path constituted by the resistor 38 and switch 21. Thus, the capacitor 39 is not able to charge through the resistor 41 to a significant voltage.

The switch 33 is designed to sense when the engine is in operation. The switch 33 is closed when the engine is not operating and opens when the engine is operating. The switch 33 may be actuated in accordance with the engine speed (revolutions per minute), oil pressure, alternator voltage or the like.

With the engine in operation the switch 33 is open. The voltage across the capacitor 39 is very low and is applied to the transistor 46 through the diode 44. The low gate voltage of the transistor 46 causes the transistor 46 to be turned off. Thus, the voltage at the base of the transistor 51 is high and the transistor 51 is turned off. The transistor 51 blocks current flow through the coil 52 and causes the coil 52 to be de-energized. With the coil 52 de-energized, the contact 54 engages with the contact 56 to connect the switch 61 to the bus line 43.

When, however, the refrigerant in the reservoir 11 drops below the predetermined level indicating a shortage of refrigerant due to leakage or the like, the switch 21 opens. This removes the low resistance path across the capacitor 39 and allows the capacitor 39 to charge through the resistor 41. The capacitor 39 and resistor 41 constitute a time constant circuit which functions as a delay means. From the time the switch 21 is opened, a delay of 10 to 30 seconds occurs before the voltage across the capacitor 39 rises to the turn-on voltage of the transistor 46.

When the voltage at the junction of the capacitor 39 and resistor 41 reaches the turn-on voltage of the transistor 46, the transistor 46 is turned on and the voltage at the base of the transistor 51 goes low. This turns on the transistor 51 and allows current to flow through the coil 52. The coil 52 is thereby energized and causes the contact 54 to engage with the contact 57. This disconnects the switch 61 from the bus line 43 and prevents the clutch 63 from being energized. Assuming that the air conditioning apparatus 31 was in operation at the time the switch 21 was opened, de-energization of the clutch 63 will disconnect the compressor 64 from the engine and shut off the air conditioning apparatus 31.

Engagement of the contact 54 with the contact 57 connects the lamp 58 across the battery 37. The lamp 58 lights indicating insufficient refrigerant in the reservoir 11.

It often occurs that the refrigerant level drops below the predetermined level when the compressor 64 is shut off even if there is sufficient refrigerant in the apparatus 31. In such a case, the switch 21 would open and prevent the compressor 64 from being connected to the engine. Since the refrigerant level in the reservoir 11 could not rise unless the apparatus 31 was operated for a certain length of time by driving the compressor 64, the erroneous opening of the switch 21 would prevent the air conditioning system 31 from being operated.

This erroneous situation is inhibited in two ways. It will be understood that the compressor 64 is not operated when the engine is not in operation and also when the sensed temperature is low and the switch 61 disconnects the clutch 63 from the battery 37.

When the temperature is low, the contact 62 of the switch 61 engages with the contact 67 connecting the junction of the resistor 41 and capacitor 39 to the clutch 63. The clutch 63 typically comprises a solenoid coil of low resistance. Thus, the junction of the resistor 41 and capacitor 39 is connected to ground through a low resistance path constituted by the coil of the clutch 63 and the voltage across the capacitor 39 is maintained at a low value. If the capacitor 39 had a substantial charge across it prior to engagement of the contact 62 with the contact 67, the capacitor 39 would discharge through the clutch 63. The values of the capacitor 39 and resistor 41 are selected so that any current flow through the clutch 63 through the resistor 41 or due to discharge of the capacitor 39 is insufficient to cause engagement of the clutch 63.

The second means for preventing erroneous shut-off of the air conditioning apparatus 31 is constituted by the switch 33. The switch 33 is closed when the engine is not operating and thereby connects the junction of the capacitor 39 and the resistor 41 to ground through a low resistance path constituted by the resistor 38, diode 32 and the switch 33. The diode 32 prevents the capacitor 39 from charging through the resistor 38 and lamp 34. The switch 33 in its closed condition connects the lamp 34 across the battery 37 and causes it to light indicating that the engine is not in operation.

The effect of grounding the junction of the resistor 41 and capacitor 39 through the switch 33 is the same as grounding it through the switch 21. Even if the switch 21 is opened in response to a low refrigerant level the capacitor 39 will not charge while the engine is not operating.

The switch 33 will open after the engine is started. If the switch 21 is open, the capacitor 39 will charge through the resistor 41. However, due to the delay of 10 to 30 seconds, the compressor 64 will have sufficient time to compress refrigerant and restore the level in the reservoir 11 to the predetermined value at which time the switch 21 will close. The capacitor 39 will discharge quickly through the low value resistor 38 and switch 21, preventing the compressor 64 from being erroneously shut off and allowing the air conditioning apparatus 31 to operate.

Figure 4:
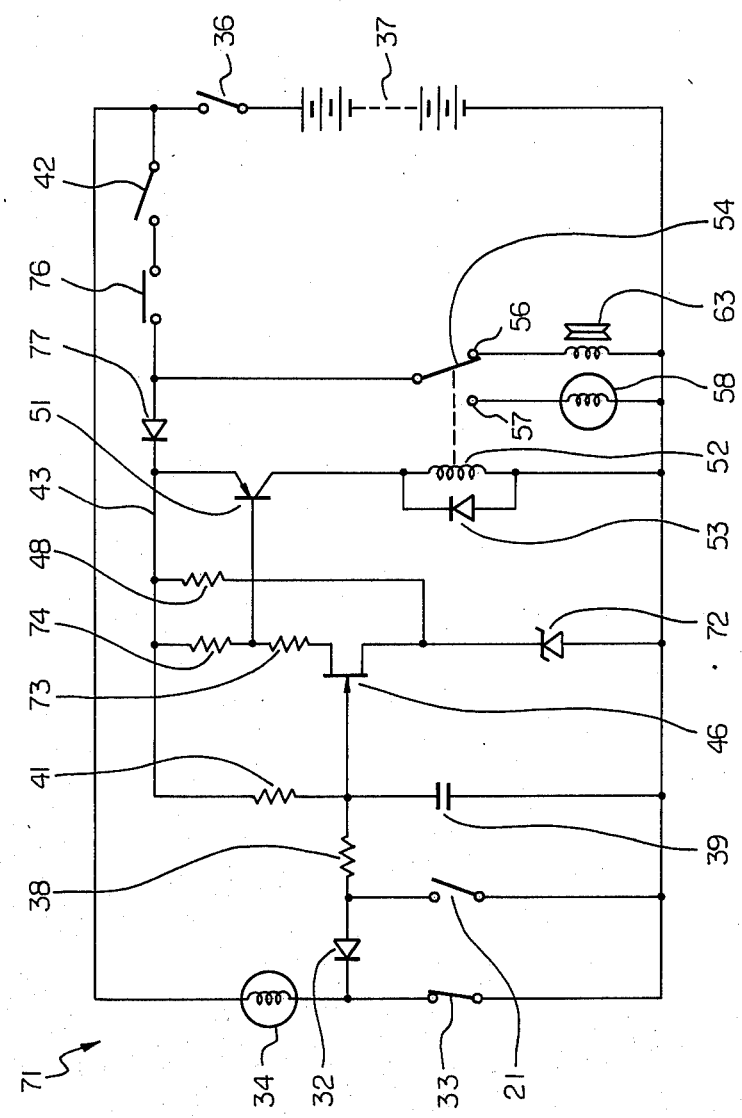
FIG. 4 is similar to FIG. 3 but shows a second embodiment.

Another air conditioning apparatus embodying the present invention is shown in FIG. 4 and designated as 71. Like elements are designated by the same reference numerals used in FIG. 3. As the basic operation and construction of the apparatus 71 is similar to that of the apparatus 31, only the differences therebetween will be described.

In the apparatus 71 the resistor 47 is replaced by a zener diode 72. The resistor 49 is replaced by two resistors 73 and 74, the junction of which is connected to the base of the transistor 51.

The thermal switch 61 is replaced by a thermal switch 76 which is connected between the switch 42 and the contact 54. The switch 76 is open when the temperature is below the predetermined value and viceversa. The junction of the switch 76 and contact 54 is connected to the anode of a diode 77, the cathode of which is connected to the bus line 43.

The difference in operation between the embodiments of FIGS. 3 and 4 is in the thermal switches 61 and 76 respectively. When the switch 76 is closed, power is supplied from the battery 37 to the bus line 43 and clutch 63. When the switch 76 is open, the clutch 63 cannot be engaged and also power is removed from the bus line 43. This latter operation prevents the capacitor 39 from charging and preventing the clutch 63 from engaging when the switch 76 is closed.

Figure 5:
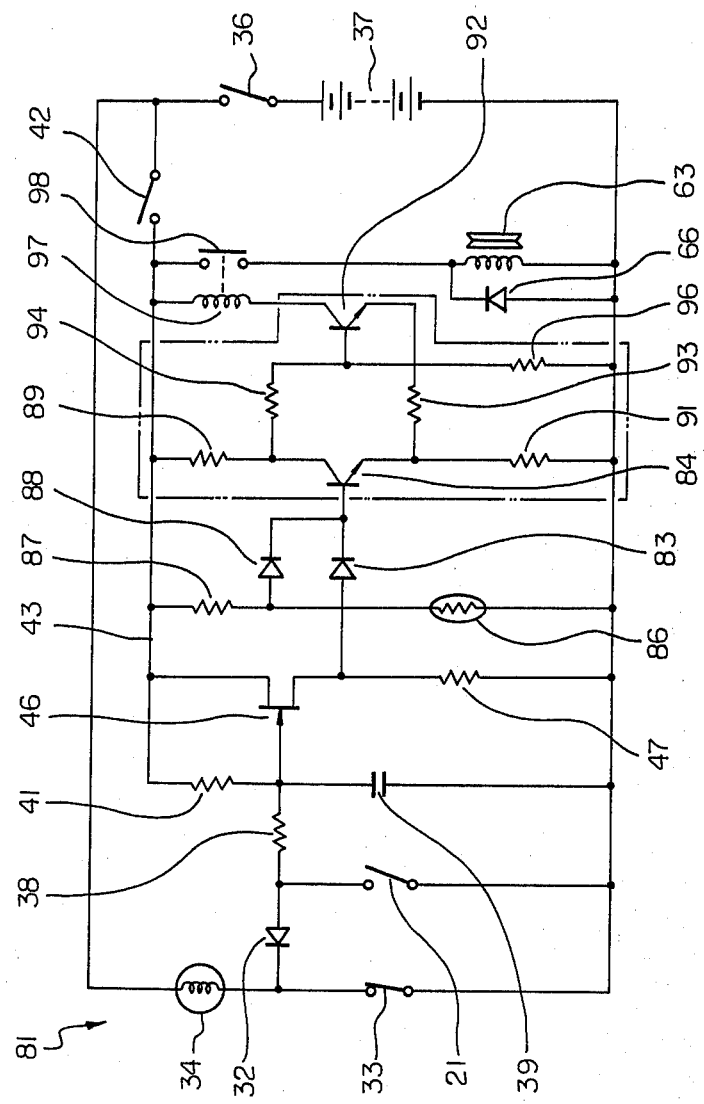
FIG. 5 is also similar to FIG. 3 but shows a third embodiment.

Another apparatus embodying the present invention is shown in FIG. 5 and designated as 81. The resistor 49 is omitted and the drain of the transistor 46 is connected to the anode of a diode 83. The cathode of the diode 83 is connected to the base of a transistor 84 of a Schmitt trigger circuit 82.

The thermal switch is replaced by a temperature sensor comprising a thermistor 86 connected in series with a resistor 87 between the bus line 43 and ground. As the temperature increases, the voltage at the junction of the thermistor 86 and resistor 87 decreases.

The junction of the thermistor 86 and resistor 87 is connected to the anode of a diode 88, the cathode of which is connected to the base of the transistor 84. The collector of the transistor 84 is connected through a resistor 89 to the bus line 43. The emitter of the transistor 84 is connected to ground through a resistor 91 and also to the emitter of a transistor 92 through a resistor 93. The collector of the transistor 84 is connected to ground through resistors 94 and 96, the junction of which is connected to the base of the transistor 92.

The collector of the transistor 92 is connected to the bus line 43 through a relay coil 97 which controls contacts 98 connected in series with the clutch 63 between the bus line 43 and ground. The contacts 98 are normally open and are closed when the coil 97 is energized.

When the temperature is above the predetermined value, the voltage across the thermistor 86 is low. The diodes 83 and 88 connect the thermistor 86 and transistor 46 in parallel in such a manner that the voltage at the base of the transistor 84 is equal to the highest of the voltages at the junction of the thermistor 86 and resistor 87 and the drain of the transistor 46. Thus, the diodes 83 and 88 function as an analog OR gate. In the present cast, the voltage across the thermistor 86 is low and, assuming that the switch 21 is closed and the voltage at the drain of the transistor 46 is low, the transistor 84 is turned off. This causes the transistor 92 to be turned on and energize the coil 97 to engage the clutch 63.

If the refrigerant level goes low and the switch 21 opens, the drain voltage of the transistor 46 goes high and the transistor 84 is turned on. This turns off the transistor 92 and disengages the clutch 63.

The same effect occurs if the temperature goes below the predetermined value. The voltage at the junction of the thermistor 86 and resistor 87 goes high and the transistor 84 is turned on. The transistor 92 is turned off and the clutch 63 is de-energized.

The Schmitt trigger circuit 82 provides a hysteresis function which is desirable for the temperature sensor. The compressor 64 is turned off at a certain temperature and turned back on at a higher temperature corresponding to the upper and lower trip points respectively of the Schmitt trigger circuit 82.

In summary, it will be seen that the present invention provides an air conditioning apparatus comprising a refrigerant shortage sensor which does not provide erroneous operation even though the refrigerant level temporarily drops below a predetermined sensing value due to the fact that the compressor 64 is shut off. Due to the delay means, the compressor 64 will not be shut off due to momentary opening of the switch 21 due to vibration or chattering. Various modifications will become possible for those skilled in the art after receiving the teachings of the present disclosure without departing from the scope thereof.

What is claimed is:

1. An air conditioning apparatus including a motor driven compressor and a refrigerant reservoir connected to the compressor, characterized by comprising:
   level sensor means for producing an electrical signal when a refrigerant level in the reservoir is below a predetermined value;
   level switch means for normally controlling the compressor to be motor driven and for controlling the compressor to be not motor driven in response to the electrical signal;
   delay means connected between the level sensor means and the level switch means for delaying the electrical signal for a predetermined length of time; and
   temperature sensor means for controlling the compressor to be motor driven only when a sensed temperature is above a predetermined value;
   the temperature sensor means comprising means for inhibiting the level sensor means from producing the electrical signal when the sensed temperature is below the predetermined value.

2. An apparatus as in claim 1, in which the level sensor means comprises a float and a switch actuated by the float.

3. An apparatus as in claim 1, further comprising operation sensor means for sensing motor operation and enabling the level sensor means only in response thereto.

4. An apparatus as in claim 1, in which the temperature sensor means comprises a thermal switch which is connected in series with the level switch means.

5. An apparatus as in claim 4, further comprising a power source which is connected across the series combination of the level switch means and the thermal switch.

6. An apparatus as in claim 5, in which the level sensor means is adapted to be powered by the power source, the thermal switch being connected between the power source and the level sensor means.

7. An apparatus as in claim 1, in which the temperature sensor means is connected in parallel with the level sensor means.

8. An apparatus as in claim 1, in which the temperature sensor means comprises a thermistor.

9. An apparatus as in claim 1, in which the temperature sensor means comprises hysteresis means.

10. An air conditioning apparatus including a motor driven compressor and a refrigerant reservoir connected to the compressor, characterized by comprising:
    level sensor means for producing an electrical signal when a refrigerant level in the reservoir is below a predetermined value;
    level switch means for normally controlling the compressor to be motor driven and for controlling the compressor to be to be not motor driven in response to the electrical signal;
    delay means connected between the level sensor means and the level switch means for delaying the electrical signal for a predetermined length of time; and
    operation sensor means for sensing motor operation and enabling the sensor means only in response thereto;
    the delay means comprising a time constant circuit including a resistor and a capacitor, the operation sensor means comprising means for discharging the capacitor in response to motor non-operation.

11. An air conditioning apparatus including a motor driven compressor and a refrigerant reservoir connected to the compressor, characterized by comprising:
    level sensor means for producing an electrical signal when a refrigerant level in the reservoir is below a predetermined value;
    level switch means for normally controlling the compressor to be motor driven and for controlling the compressor to be not motor driven in response to the electrical signal;
    delay means connected between the level sensor means and the level switch means for delaying the electrical signal for a predetermined length of time;
    temperature sensor means for controlling the compressor to be motor driven only when a sensed temperature is above a predetermined value;
    the delay means comprising a time constant circuit including a resistor and a capacitor, the temperature sensor means comprising means for discharging the capacitor when the sensed temperature is below the predetermined value.

12. An air conditioning apparatus including a motor driven compressor and a refrigerant reservoir connected to the compressor, characterized by comprising:
    level sensor means for producing an electrical signal when a refrigerant level in the reservoir is below a predetermined value;
    level switch means for normally controlling the compressor to be motor driven and for controlling the compressor to be not motor driven in response to the electrical signal;
    delay means connected between the level sensor means and the level switch means for delaying the electrical signal for a predetermined length of time; and
    temperature sensor means for controlling the compressor to be motor driven only when a sensed temperature is above a predetermined value;
    the temperature sensor means comprising a thermal switch which is connected in series with the level switch means.

13. An apparatus as in claim 12, further comprising a power source which is connected across the series combination of the level switch means and the thermal switch.

14. An apparatus as in claim 13, in which the level sensor means is adapted to be powered by the power source, the thermal switch being connected between the power source and the level sensor means.

* * * * *